US012743037B2

(12) United States Patent
Suzuki et al.

(10) Patent No.: US 12,743,037 B2
(45) Date of Patent: Sep. 22, 2026

(54) CHARGING ROLL

(71) Applicant: SYNZTEC CO., LTD., Kanagawa (JP)

(72) Inventors: Shogo Suzuki, Kanagawa (JP); Atsushi Ikeda, Kanagawa (JP); Satoshi Fukuoka, Kanagawa (JP); Kenji Sasaki, Kanagawa (JP)

(73) Assignee: SYNZTEC CO., LTD., Kanagawa (JP)

( * ) Notice: Subject to any disclaimer, the term of this patent is extended or adjusted under 35 U.S.C. 154(b) by 0 days.

(21) Appl. No.: 18/274,901

(22) PCT Filed: Dec. 3, 2021

(86) PCT No.: PCT/JP2021/044523

§ 371 (c)(1),
(2) Date: Jul. 28, 2023

(87) PCT Pub. No.: WO2022/163128

PCT Pub. Date: Aug. 4, 2022

(65) Prior Publication Data

US 2024/0094656 A1 Mar. 21, 2024

(30) Foreign Application Priority Data

Feb. 1, 2021 (JP) ................................ 2021-014165

(51) Int. Cl.
*G03G 15/02* (2006.01)

(52) U.S. Cl.
CPC ................................ *G03G 15/0233* (2013.01)

(58) Field of Classification Search
CPC .......... G03G 15/0233; G03G 15/0818; G03G 15/1685; G03G 15/162; G03G 21/06
See application file for complete search history.

(56) References Cited

U.S. PATENT DOCUMENTS 10,353,317 B1 7/2019 Wu
2010/0009282 A1* 1/2010 Katoh ............... G03G 9/09716 399/168

(Continued)

FOREIGN PATENT DOCUMENTS

JP 2001-92221 4/2001
JP 2005-91414 A 4/2005

(Continued)

OTHER PUBLICATIONS

ISR for PCT/JP2021/044523, dated Jan. 18, 2022 (w/ translation).

(Continued)

*Primary Examiner* — Jessica L Eley
(74) *Attorney, Agent, or Firm* — GREENBLUM & BERNSTEIN, P.L.C.

(57) ABSTRACT

A charging roll includes a core, a rubber substrate arranged around the core, and a surface layer arranged around the rubber substrate. The surface layer includes a conductive matrix containing a base material formed of an insulator, and a conductive material dispersed in the base material, and particles of a surface roughness-imparting material dispersed in the conductive matrix. Each of the particles of the surface roughness-imparting material is formed of an insulator, is porous, and has a specific surface area of 8.7 $m^2/g$ or greater and 55 $m^2/g$ or less.

7 Claims, 5 Drawing Sheets

(56) References Cited

U.S. PATENT DOCUMENTS

| | | | | |
|---|---|---|---|---|
| 2010/0104316 | A1* | 4/2010 | Hoshio | G03G 15/0233 399/176 |
| 2011/0299887 | A1 | 12/2011 | Miyaji et al. | |
| 2014/0295336 | A1 | 10/2014 | Miyagawa et al. | |
| 2014/0308607 | A1 | 10/2014 | Taniguchi et al. | |
| 2015/0301469 | A1 | 10/2015 | Aoyama et al. | |
| 2016/0266511 | A1* | 9/2016 | Kuroda | G03G 15/0233 |
| 2016/0306288 | A1* | 10/2016 | Wu | G03G 15/0233 |
| 2018/0107134 | A1 | 4/2018 | Watanabe et al. | |
| 2018/0364604 | A1* | 12/2018 | Fujino | G03G 15/0233 |
| 2019/0235409 | A1* | 8/2019 | Saito | H01B 1/20 |

FOREIGN PATENT DOCUMENTS

| | | | | | |
|---|---|---|---|---|---|
| JP | 2006-84544 | A | | 3/2006 | |
| JP | 2009-175427 | | | 8/2009 | |
| JP | 2012-14141 | A | | 1/2012 | |
| JP | 2015-28503 | A | | 2/2015 | |
| JP | 2015-121769 | A | | 7/2015 | |
| JP | 2015-212812 | | | 11/2015 | |
| JP | 2017-83711 | A | | 5/2017 | |
| JP | 2017083711 | A | * | 5/2017 | G03G 15/0233 |
| JP | 2018-132658 | A | | 8/2018 | |
| JP | 2019-178559 | | | 10/2019 | |
| JP | 2019-191519 | | | 10/2019 | |
| WO | 2020/050133 | | | 3/2020 | |
| WO | 2021/145924 | | | 7/2021 | |

OTHER PUBLICATIONS

Japan, Notice of Reasons for Refusal received in JP patent application No. 2022-578093, dated Jun. 25, 2024.

Japan, Notice of Reasons for Refusal issued in JP Application No. 2022-578093, dated Oct. 1, 2024.

Extended European Search Report issued in EP Application No. 21923133.9, dated Feb. 4, 2025.

Japan Office Action received in JP Application No. 2022-578093, dated Jan. 28, 2025, and English language.

Vietnam, Office Action received in VN patent application (1-2023-04544) dated Sep. 5, 2025, and the enclosed. English translation.

China, Office Action received in CN Patent Application No. 202180091868.5, dated Mar. 31, 2026, and English translation.

Japan, Decision on Appeal issued in counterpart JP patent application No. JP 2022-578093, dated Jul. 21, 2026, and English translation.

* cited by examiner

Fig.5

| Composition of Coating Liquid | | | |
|---|---|---|---|
| Function | Material | Details of Material | Proportion (Parts by Weight) |
| Diluent Solvent | Ethyl Acetate | | 60.0 |
| Base Material | Urethane Resin | | 19.9 |
| | Details of Base Material | | |
| | Polyol | "T5650E" Manufactured by Asahi Kasei Chemicals Corporation (Tokyo, Japan) | 10.8 |
| | Isocyanurate | "TPA-100" Manufactured by Asahi Kasei Chemicals Corporation (Tokyo, Japan) | 9.1 |
| Conductive Material | Carbon Dispersion Liquid | "MHI-BK" (Carbon Content of 20 to 30 Weight%) Manufactured by Mikuni-Color Ltd. (Hyogo, Japan) | 18.4 |
| Additive | Acrylic Silicone Polymer | "MODIPER FS700" Manufactured by NOF CORPORATION (Tokyo, Japan) | 1.0 |
| Surface Roughness-Imparting Material | See Specification | See Specification | See Specification |

Fig. 6

| | Surface Roughness-Imparting Material | | | | Surface Layer Thickness (μm) | Surface Roughness RZ (μm) | Real Contact Area Rate (%) | Result of Durability Test |
|---|---|---|---|---|---|---|---|---|
| | Shape | Material | Particle Size (μm) | Additive Rate (Weight%) | | | | |
| Sample 1 | Truly Spherical | Urethane | 6 | 4 | 6 | 6.5 | 2.2 | Bad |
| Sample 2 | Truly Spherical | Urethane | 6 | 2 | 20 | 3.1 | 5.4 | Bad |
| Sample 3 | Porous (Type of Fig. 4) | Urethane | 6 | 4 | 3 | 10.6 | 1.2 | Good |
| Sample 4 | Porous (Type of Fig. 4) | Urethane | 6 | 4 | 6 | 6.1 | 2.9 | Good |
| Sample 5 | Porous (Type of Fig. 4) | Urethane | 6 | 2 | 13 | 4.9 | 3.3 | Good |
| Sample 6 | Porous (Type of Fig. 3) | Polyamide | 5 | 2 | 8 | 3.5 | 4.5 | Good |
| Sample 7 | Porous (Type of Fig. 3) | Polyamide | 5 | 2 | 17 | 3.3 | 9.8 | Good |

CHARGING ROLL

CROSS REFERENCE TO RELATED APPLICATIONS

The present application is a national phase application of International Patent Application No. PCT/JP2021/044523 filed on Dec. 3, 2021, which claims the benefit of Japanese Patent Application No. 2021-014165, filed on Feb. 1, 2021. The contents of these applications are incorporated herein by reference in their entirety.

BACKGROUND

Technical Field

The present disclosure relates to a charging roll of an image-forming apparatus.

Related Art

The quality of an image formed by an image-forming apparatus, such as an electrophotographic copying machine, depends on the uniformity of the charged state of a photoconductor drum, and the surface roughness of a charging roll influences the uniformity of the charged state. Conventionally, Japanese Patent Application Publications No. 2015-121769, No. 2012-14141 and No. 2005-91414 are known as technologies that describe the surface roughness of a charging roll.

Japanese Patent Application Publication No. 2015-121769 describes a technology related to a charging member (i.e., a charging roll) including a conductive support, a conductive elastomer layer stacked on the conductive support, and a conductive resin layer stacked as the outermost layer on the conductive elastomer layer. The conductive resin layer contains a matrix material and at least one type of particles selected from the group consisting of resin particles and inorganic particles.

Japanese Patent Application Publication No. 2012-14141 describes a technology related to an image forming apparatus including a positively-charged single layer type electrophotographic photoconductor drum, a charging device having a contact charging member for charging the surface of the photoconductor drum, an exposure device for exposing the charged surface of the image carrier to light and forming an electrostatic latent image on the surface of the image carrier, a developing device for developing the electrostatic latent image into a toner image, and a transfer device for transferring the toner image from the image carrier to a transferred body. The contact charging member is a charging roller made of conductive rubber, a rubber hardness of which is an Asker-C rubber hardness of 62° to 81°, and the roller surface roughness of the charging roller of the contact charging member is such that the average distance $S_m$ between asperity is 55 μm to 130 μm and that the ten-point average roughness $R_z$ is 9 μm to 19 μm.

Japanese Patent Application Publication No. 2005-91414 describes a technology related to a charging roller including a conductive support, a semiconductive elastic layer formed in a rolled state on the conductive support, and a protective layer formed on the surface of the semiconductive elastic layer. The protective layer is formed by applying a coating liquid for forming a protective layer that contains fine particles for exhibiting a function of preventing adhesion of foreign matter to the protective layer. The volume average particle size of the fine particles is set small so as to allow the surface roughness of the protective layer to be less than or equal to 1 μm.

According to Japanese Patent Application Publications No. 2015-121769, No. 2012-14141 and No. 2005-91414, the surface roughness of the outermost surface of the charging roll is adjusted with the fine particles contained in the surface layer so that electric discharge that occurs between the charging roll and the photoconductor drum is made as uniform as possible, and the image quality is thus improved.

Surface roughness of a charging roll can be controlled by adjusting a thickness of a binder (a matrix) of a surface layer and also adjusting a diameter and an amount of particles added to the binder.

It is desirable that the charging roll be capable of maintaining high image quality for a long period of time.

The present disclosure provides a charging roll that can maintain high image quality for a long period of time.

SUMMARY

An aspect of the present disclosure provides a charging roll. The charging roll includes a core, a rubber substrate arranged around the core, and a surface layer arranged around the rubber substrate. The surface layer includes a conductive matrix containing a base material formed of an insulator, and a conductive material dispersed in the base material, and particles of a surface roughness-imparting material dispersed in the conductive matrix. Each of the particles of the surface roughness-imparting material is formed of an insulator, is porous, and has a specific surface area of 8.7 $m^2/g$ or greater and 55 $m^2/g$ or less.

According to such an aspect, in comparison with truly spherical particles, porous particles are large in surface area, and the conductive matrix enters micropores. Thus, the particles are firmly fixed to the conductive matrix. Therefore, even when the diameter of the particles of the roughness-imparting material is large relative to the thickness of the conductive matrix, the particles are unlikely to come off the conductive matrix. In addition, by setting the diameter of the particles of the roughness-imparting material to be large relative to the thickness of the conductive matrix, it is possible to appropriately increase the surface roughness of the surface layer. This can reduce a contact area of the charging roll relative to a surface of a photoconductor drum, and thus can suppress a disturbance of electric discharge due to adhesion of external additives and the like in toner particles on the photoconductor drum. In this manner, high image quality can be maintained for a long period of time.

BRIEF DESCRIPTION OF THE DRAWINGS

FIG. 5 is a table showing composition of a coating liquid for forming the surface layer of the charging roll.

FIG. 6 is a table showing details of each sample on which a durability test for a charging roll was performed, and the results of the test.

DETAILED DESCRIPTION

Hereinafter, an embodiment according to the present disclosure will be described in detail. The scale of each drawing does not necessarily represent the correct size of a product or a sample of the embodiment, and some of the dimensions may be represented in an exaggerated way in some cases.

Figure 1:
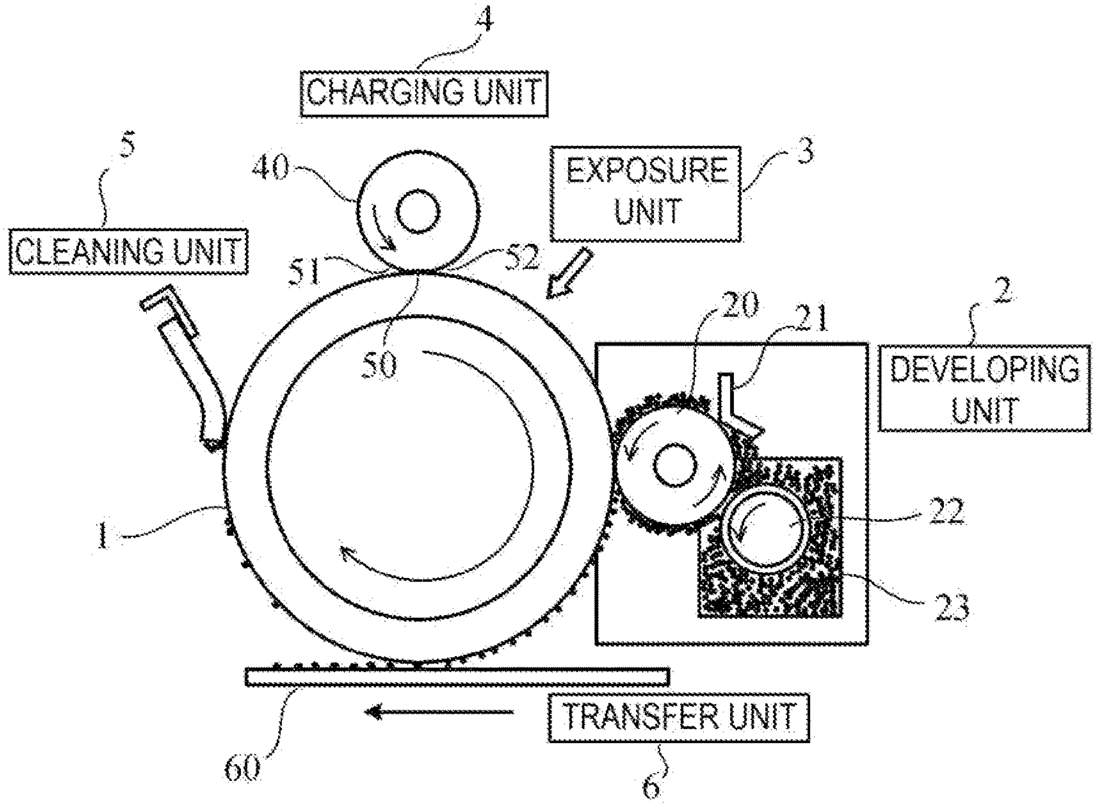
FIG. 1 is a schematic view illustrating an example of an image-forming apparatus that uses a charging roll according to an embodiment of the present disclosure.

As illustrated in FIG. 1, an image-forming apparatus according to an embodiment of the present disclosure includes a photoconductor drum 1. A developing unit 2, an exposure unit 3, a charging unit 4, a transfer unit 6, and a cleaning unit 5 are arranged around the photoconductor drum 1. A developing roll 20, a regulating blade 21, and a feed roll 22 are provided in the developing unit 2, the developing unit 2 is filled with toner 23. A charging roll 40 is provided in the charging unit 4. The transfer unit 6 transfers a toner image to a sheet 60 of paper that is a recording medium. The toner image transferred by the transfer unit 6 is fixed with a fixation unit (not illustrated).

The cylindrical and rotary photoconductor drum 1 and the cylindrical and rotary charging roll 40 contact each other at a nip 50. Electric discharge occurs between the photoconductor drum 1 and the charging roll 40 in a region 51 ahead of the nip 50 in a direction of rotation of the photoconductor drum 1 and the charging roll 40 (and a region 52 behind the nip 50 in addition to the ahead region 51 in some cases), so that a surface of the photoconductor drum 1 is charged. It is preferable that the charged state of the surface of the photoconductor drum 1 be uniform in a circumferential direction and an axis direction of the photoconductor drum 1.

Figure 2:
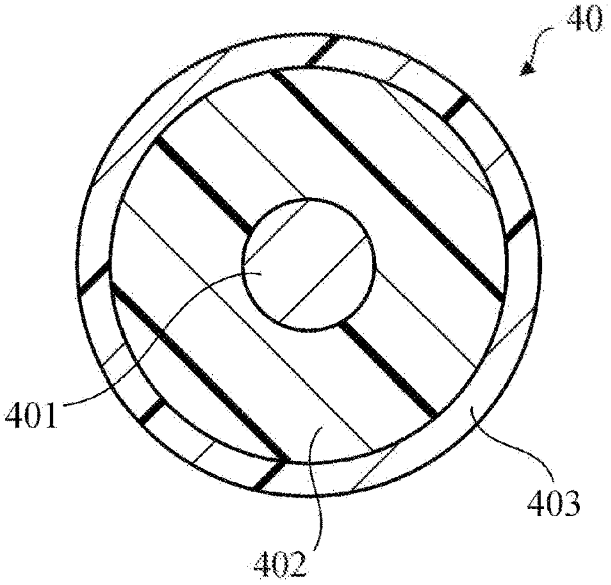
FIG. 2 is a cross-sectional view illustrating an example of the charging roll according to the embodiment of the present disclosure.

FIG. 2 is a cross-sectional view illustrating an example of the charging roll according to the embodiment of the present disclosure. As illustrated in FIG. 2, the charging roll 40 includes a core 401, a rubber substrate 402 formed on an outer peripheral surface of the core 401, and a surface layer 403 coating an outer peripheral surface of the rubber substrate 402. By forming the surface layer 403 with coating components on the outer peripheral surface of the rubber substrate 402, and making surface roughness of the surface layer 403 appropriate, it is possible to solve uneven electric discharge between the photoconductor drum 1 and the charging roll 40, and thus uniformly charge the photoconductor drum 1. Therefore, the developing unit 2 can allow an amount of toner that precisely corresponds to a latent image formed in the exposure unit 3 to stick to the surface of the photoconductor drum 1.

The core 401 can be formed with a metal or resin material that is excellent in thermal conductivity and mechanical strength. Material of the core 401 can be formed from, for example, but not limited to, a metal material such as stainless steel, nickel (Ni), nickel alloy, iron (Fe), magnetic stainless steel, or cobalt-nickel (Co—Ni) alloy; or a resin material such as PI (polyimide resin). A structure of the core 401 is not limited to a particular structure, and thus, the core 401 may be hollow or not hollow. It is preferable that the surface of the core 401 be smooth.

The rubber substrate 402 is formed with conductive rubber having conductivity. The rubber substrate 402 may have one layer or two or more layers. In addition, an adhesive layer, an adjustment layer, and the like may be provided between the core 401 and the rubber substrate 402 as appropriate.

The rubber substrate 402 can be formed by forming a rubber composition, which has been obtained by adding a conductivity-imparting material, a cross-linker, and the like to conductive rubber, around the core 401. Examples of the conductive rubber include conductive rubber such as polyurethane rubber (PUR), epichlorohydrin rubber (ECO), nitrile rubber (NBR), styrene rubber (SBR), and chloroprene rubber (CR).

As the conductivity-imparting material, it is possible to use an electron conductivity-imparting material, such as carbon black or metallic powder, an ion conductivity-imparting material, or a mixture thereof. Examples of the ion conductivity-imparting material include ion conductivity-imparting materials such as an organic salt, an inorganic salt, a metal complex, and an ionic liquid. Examples of the organic salt include an organic salt such as sodium trifluoroacetate. Examples of the inorganic salt include inorganic salts such as lithium perchlorate and quaternary ammonium salts. Examples of the metal complex include a metal complex such as ferric halide-ethylene glycol, and specifically, those disclosed in Japanese Patent No. 3655364 may be used. The ionic liquid is a molten salt that is a liquid at room temperature. The ionic liquid is also referred to as an ambient-temperature molten salt, in particular, a melting point of the ionic liquid is less than or equal to 70° C., preferably, less than or equal to 30° C. Specifically, those described in Japanese Patent Application Publication No. 2003-202722 may be used.

As the cross-linker, for example, but not particularly limited to, cross-linkers such as sulfur or a peroxide vulcanizing agent may be used.

Further, a cross-linking accelerator that promotes action of the cross-linker, for example, may also be added to the rubber composition, as appropriate. Examples of the cross-linking accelerator include inorganic accelerators, such as zinc oxide and magnesium oxide, and organic accelerators, such as stearic acid and amines. In addition, to shorten the cross-linking time or for other purposes, a thiazole-based cross-linking accelerator or other cross-linking accelerators may be used. The rubber composition may also contain other additives as appropriate.

To produce the charging roll 40, the surface of the rubber substrate 402 formed on the outer peripheral surface of the core 401 is polished with a polishing machine so as to allow the rubber substrate 402 to have a predetermined thickness, and is further subjected to dry polishing with a polishing stone, and then, the surface layer 403 is formed on the outer peripheral surface of the rubber substrate 402. Such polishing is performed to appropriately adjust surface roughness of the rubber substrate 402, and thus adjust surface roughness of the surface layer 403 on the outer side of the rubber substrate 402.

To minimize the surface roughness of the rubber substrate 402, it is preferable that ten-point average roughness (ten point height of irregularities) $R_z$ that complies with surface roughness (JIS B 0601:1994) of the rubber substrate 402 be less than or equal to 8.5 μm. In such a case, the surface roughness $R_z$ is a value measured with a contact-type surface roughness meter.

The dry polishing is performed by moving a rotary stone in the axis direction of the core 401 while allowing the rotary stone to contact the rubber substrate 402 in a state where the rubber substrate 402 is rotated, for example (traverse polishing). To minimize the surface roughness of the rubber substrate 402, the number of revolutions of the stone of the polishing machine may be sequentially increased from 1000 rpm to 2000 rpm and 3000 rpm during the rotation, for example. Alternatively, the type of the polishing stone may be changed. For example, polishing may be performed by sequentially increasing a grit size of GC (green carborundum) from GC60 to GC120 and GC220.

After the surface of the rubber substrate 402 is dry-polished, it may be further subjected to wet polishing by means of a wet-polishing machine with waterproof polishing paper, for example. The wet polishing is performed with waterproof polishing paper, such as waterproof sandpaper, for example, in a manner such that the rubber substrate 402 in a rotational state is brought into contact with the sandpaper while supplying a polishing liquid to the sandpaper.

It is preferable that hardness of the rubber substrate 402 measured with a durometer ("type-A" compliant with "JIS K 6253" and "ISO 7619") be in the range of 50° to 64°.

Since the surface layer 403 on the outer side of the rubber substrate 402 is thin, hardness of the surface of the charging roll 40 is influenced by the rubber substrate 402. If the hardness of the rubber substrate 402 is less than 50°, projections on the surface of the charging roll 40 are squashed so that the photoconductor drum 1 is likely to get dirty, and a defective image is thus generated. Meanwhile, if the hardness of the rubber substrate 402 is greater than 64°, the projections on the surface of the charging roll 40 may be reflected into a resulting image.

The surface layer 403 can be formed by applying a coating liquid to the outer peripheral surface of the rubber substrate 402, and then drying it to cure. As a method for applying the coating liquid, methods such as dip coating, roll coating, and spray coating can be used.

Figure 3:
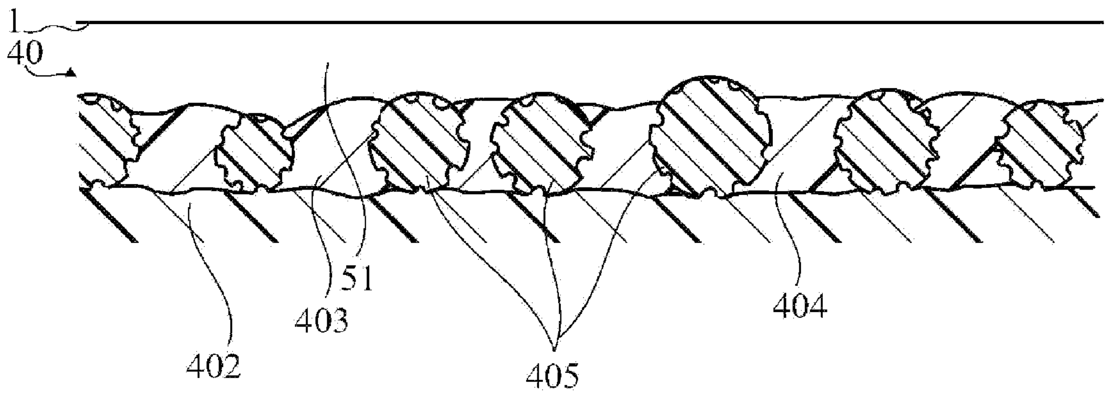
FIG. 3 is a cross-sectional view of an example of a rubber substrate and a surface layer cut along the axis direction of the charging roll.
Figure 4:
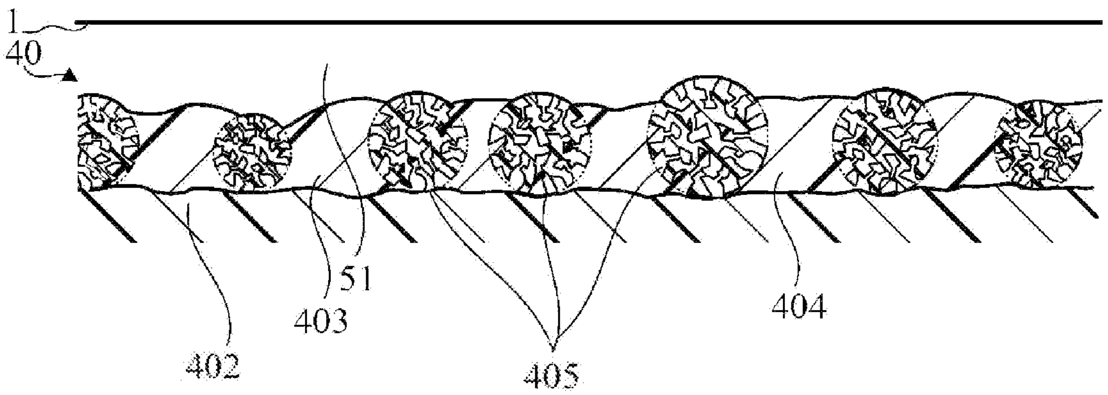
FIG. 4 is a cross-sectional view of another example of a rubber substrate and a surface layer cut along the axis direction of the charging roll.

As illustrated in FIGS. 3 and 4, the cured surface layer 403 contains a conductive matrix 404 and particles 405 of a surface roughness-imparting material (also referred to as a roughness-imparting material) with an insulating property, for example, dispersed in the conductive matrix 404.

The particles 405 of the roughness-imparting material impart appropriate surface roughness to the surface layer 403. If the surface of the surface layer 403 is too smooth, the contact area between the surface layer 403 and the photoconductor drum 1 increases. Accordingly, it is considered that after a long period of use, external additives and the like in the toner particles on the photoconductor drum 1 adhere to the surface of the surface layer 403, which in turn disturbs electric discharge and thus causes image unevenness. In the present embodiment, the particles 405 of the roughness-imparting material are dispersed in the surface layer 403 formed on the rubber substrate 402 with the adjusted surface roughness so that the surface roughness of the surface layer 403 is adjusted.

The conductive matrix 404 serves a role of holding the particles 405 of the roughness-imparting material at fixed positions, and a role of performing electric discharge to the photoconductor drum 1. The conductive matrix 404 contains a base material and a conductive agent dispersed in the base material. As described above, electric discharge between the charging roll 40 and the photoconductor drum 1 occurs in the region 51 (and the region 52 in some cases).

In the examples illustrated in FIGS. 3 and 4, the particles 405 of the roughness-imparting material are not completely buried in the conductive matrix 404, but may be completely buried therein. If the thickness of the conductive matrix 404 is small, the capacity of the conductive matrix 404 to hold the particles 405 of the roughness-imparting material is low. Thus, it is preferable that the conductive matrix 404 have a sufficient thickness relative to the diameter of the particles 405 of the roughness-imparting material. Meanwhile, if the thickness of the conductive matrix 404 is too large, the surface roughness of the surface layer 403 becomes too small, so that a coefficient of friction between the surface layer 403 and the photoconductor drum 1 increases. Thus, it is preferable that the thickness of the conductive matrix 404 be in an appropriate range.

When the particles 405 of the roughness-imparting material are insulators, the thickness of the conductive matrix 404 is large, and the electric resistance of the conductive matrix 404 is high, electric discharge is less likely to occur. However, increasing the proportion of the conductive agent contained in the conductive matrix 404 can lower the electric resistance of the conductive matrix 404 and thus can allow electric discharge to more likely to occur.

It is considered preferable that the content of the particles 405 of the roughness-imparting material in the surface layer 403 be in an appropriate numerical range. If the content of the particles is high, it is considered that the particles overlap one another, so that the surface of the surface layer 403 is coarse to thereby cause image unevenness.

In the present embodiment, the components of the coating liquid that is the material of the surface layer 403 contains at least a base material, a conductive agent, and the particles 405 of the surface roughness-imparting material. After the coating liquid has cured, the base material and the conductive agent become the components of the conductive matrix 404.

The coating liquid is obtained by dissolving the components of the following composition in a diluent solvent, for example.

Base material: 10 parts by weight to 80 parts by weight.

Conductive agent: 1 part by weight to 50 parts by weight.

Surface roughness-imparting material: Less than or equal to 20 weight % of the entire coating liquid.

When the surface state of the surface layer 403 is appropriate, it is considered that electric discharge that occurs between the charging roll 40 and the photoconductor drum 1 in the region 51 ahead of the nip 50 where the charging roll 40 and the photoconductor drum 1 contact each other becomes substantially uniform so that an image with a desired concentration can be formed without uneven electric discharge generated during the formation of the image, and the image quality thus improves.

It is considered that appropriately adjusting the diameter and the added amount of the particles 405 of the surface roughness-imparting material can appropriately adjust the surface state of the surface layer 403.

The base material contained in the coating liquid is an insulator. Preferred examples of the insulator as the base material include insulators such as urethane resin, acrylic resin, acrylic urethane resin, amino resin, silicone resin, fluororesin, polyamide resin, epoxy resin, polyester resin, polyether resin, phenolic resin, urea resin, polyvinyl butyral resin, melamine resin, and nylon resin. Such insulating materials may be used alone or in any combination as the base material.

Preferred examples of the conductive agent contained in the coating liquid include carbon black, such as acetylene black, Ketjen black, and Tokablack; carbon nanotube; an ion, such as lithium perchlorate; an ionic liquid, such as 1-butyl-3-methylimidazolium hexafluorophosphate; a metal oxide, such as tin oxide; and conductive polymers. Such conductive agents may be used alone or in any combination for the coating liquid.

Preferred examples of the particles 405 of the surface roughness-imparting material contained in the coating liquid include particles such as acrylic particles, urethane particles, polyamide resin particles, silicone resin particles, fluororesin particles, styrene resin particles, phenolic resin particles, polyester resin particles, olefin resin particles, epoxy resin particles, nylon resin particles, carbon, graphite, carbonized balloon, silica, alumina, titanium oxide, zinc oxide, magnesium oxide, zirconium oxide, calcium sulfate, calcium carbonate, magnesium carbonate, calcium silicate, aluminum nitride, boron nitride, talc, kaolin clay, diatomaceous earth, glass beads, and hollow glass spheres. Such particles may be used alone or in any combination for the coating liquid.

Examples of the diluent solvent contained in the coating liquid include, but are not particularly limited to, solvents such as aqueous solvents, and solvents, such as methyl acetate, ethyl acetate, butyl acetate, methyl ethyl ketone (MEK), methyl isobutyl ketone (MIBK), methanol, ethanol, butanol, 2-propanol (IPA), acetone, toluene, xylene, hexane, heptane, and chloroform.

As described above, the particles 405 of the roughness-imparting material dispersed in the conductive matrix 404 impart appropriate surface roughness to the surface layer 403. The Applicant has obtained the following knowledge about the relationship between the conductive matrix 404 and the particles 405.

When the diameter of the particles 405 of the roughness-imparting material is large relative to the thickness of the conductive matrix 404, the depth of the particles 405 buried in the conductive matrix 404 is small, and thus, adhesion between the conductive matrix 404 and the particles 405 is low. Therefore, the particles 405 are likely to come off the conductive matrix 404. If many of the particles 405 are lost, a gap between the charging roll 40 and the photoconductor drum 1 in the region 51 becomes small, so that the charging performance changes.

However, if the diameter of the particles 405 of the roughness-imparting material is set small relative to the thickness of the conductive matrix 404 to reduce the possibility of coming off of the particles 405, the surface roughness of the surface layer 403 becomes too small, so that the contact area of the charging roll 40 with the surface of the photoconductor drum 1 increases. Thus, it is concerned that electric discharge may be disturbed more due to the adhesion of external additives and the like in toner particles on the photoconductor drum 1.

Thus, the Applicant has examined use of porous particles as the particles 405 to reduce the possibility of coming off of the particles 405 and maintain high image quality for a long period of time. The "porous particles" herein refer to particles having a number of recesses, that is, micropores at least in the surface of the particles.

As the porous particles 405, as illustrated in FIG. 3, particles in which recesses are formed only in the surface of the particles may be used. Alternatively, as illustrated in FIG. 4, it is also possible to use, as the porous particles 405, particles with a structure like sponge or foam, for example, into which micropores are formed with crossing one another.

Hereinafter, a spherical shape having no micropores on a surface of the spherical shape shall be referred to as "truly spherical." In comparison with truly spherical particles, porous particles are large in surface area, and the conductive matrix 404 enters the micropores. Thus, the particles are firmly fixed to (or anchored to) the conductive matrix 404. Therefore, even when the diameter of the particles 405 of the roughness-imparting material is large relative to the thickness of the conductive matrix 404, the particles 405 are unlikely to come off the conductive matrix 404. In this point, it is considered that the particles 405 in FIG. 4 are more preferable than the particles 405 in FIG. 3.

In addition, since the diameter of the particles 405 of the roughness-imparting material can be set large relative to the thickness of the conductive matrix 404, the surface roughness of the surface layer 403 can be appropriately increased. This can reduce the area of the charging roll 40 in contact with the surface of the photoconductor drum 1, and thus can suppress the disturbance of electric discharge due to the adhesion of external additives and the like in toner particles on the photoconductor drum 1. In this manner, high image quality can be maintained for a long period of time.

The Applicant produced a plurality of samples of charging rolls 40, and conducted a durability test on each sample to inspect if coming off of the particles 405 can be reduced.

In the test, the produced samples are as follows.

The rubber substrate 402 of each sample was formed as follows.

A rubber composition, in which 0.5 parts by weight of sodium trifluoroacetate as a conductivity-imparting material, 3 parts by weight of zinc oxide, 2 parts by weight of stearic acid, and 1.5 parts by weight of a cross-linker had been added to 100 parts by weight of epichlorohydrin rubber (EPICHLOMER CG-102 manufactured by OSAKA SODA CO., LTD. (Osaka, Japan)), was kneaded with a roller mixer.

The kneaded rubber composition was formed into a sheet-like material, and was then wound around the surface of the core 401 and press-formed thereon, so that the rubber substrate 402 made of cross-linked epichlorohydrin rubber was obtained.

The hardness of the obtained rubber substrate 402 was measured with a durometer ("type-A" compliant with "JIS K 6253" and "ISO 7619"). The measured value was 50° to 64°.

Next, the surface of the rubber substrate 402 was polished with a polishing machine. Specifically, the surface of the rubber substrate 402 was polished with a polishing machine, the rubber substrate 402 was formed to have a predetermined thickness (2 mm), and was then subjected to dry polishing by means of a polishing machine with a polishing stone. Further, the surface was subjected to wet polishing by means of a wet-polishing machine with waterproof polishing paper.

The surface roughness (ten-point average roughness) $R_z$ (compliant with JIS B 0601:1994) of the rubber substrate 402 was measured with a contact-type surface roughness measuring instrument (Surfcorder "SE500" manufactured by Kosaka Laboratory Ltd. (Tokyo, Japan)) under the following measurement conditions.

Cut-off: $\lambda c$=0.8 mm

Measurement length: 4 mm

Measurement speed: 0.5 mm/sec

Measurement positions: The surface roughness $R_z$ was measured at three positions of a single charging roll 40. Then, the mean value thereof was calculated.

The ten-point average roughness $R_z$ of the rubber substrate 402 was found to be 3 μm.

A coating liquid for forming the surface layer 403 on the outer peripheral surface of the foregoing rubber substrate 402 was produced. The composition of the coating liquid is illustrated in FIG. 5.

The following were prepared as the particles 405 of the roughness-imparting material in the coating liquid.

As truly spherical urethane particles, "Art Pearl C-800T" manufactured by Negami Chemical Industrial Co., Ltd. (Ishikawa, Japan) was used. The average diameter thereof was 6 μm. The specific surface area of the particles was 0.9 $m^2/g$.

As porous urethane particles, "Art Pearl TE-812T" manufactured by Negami Chemical Industrial Co., Ltd. (Ishikawa, Japan) was used. The average diameter thereof was 6 μm. The specific surface area of the particles was 55 $m^2/g$. The particles were of the type of FIG. 4, into which a plurality of micropores cross one another.

As porous polyamide particles, "Orgasol 2001 UD Natl" manufactured by Arkema S.A. (Colombes, France) was used. The average diameter thereof was 5 The specific surface area of the particles was 8.7 $m^2/g$. The particles were of the type of FIG. 3, in which a plurality of recesses are formed only in the surface of the particles. Though not used for the test, a specific surface area of truly spherical polyamide particles with the same diameter is 1.2 $m^2/g$.

Although the average diameter of each type of particles is described above, in practice, a single product includes particles with diameters different from the average diameter.

In each sample, the particles 405 of the surface roughness-imparting material are contained in a proportion of 2% or greater and 4% or less of the weight of the surface layer 403 (see FIG. 6).

The coating liquid with the foregoing composition was dispersed and mixed using ultrasound.

The charging roll 40 was produced by coating the outer peripheral surface of the polished rubber substrate 402 with the foregoing coating liquid and forming the surface layer 403. Specifically, Samples 1 to 7 of charging rolls were each produced by spray-coating the surface of the rubber substrate 402 with the coating liquid, drying it at 80 to 160° C. in an electric furnace for 20 to 60 minutes, and then forming the surface layer 403 on the outer peripheral surface of the rubber substrate 402.

The ten-point average roughness $R_z$ was also measured for the surface layer 403 of each sample. The measuring machine used and the measurement conditions were the same as the measuring machine used and the measurement conditions for the rubber substrate 402. FIG. 6 illustrates the mean value of the surface roughness $R_z$ measured at three positions of each sample.

The thickness of the surface layer 403 (the conductive matrix 404) of each sample was measured. For the measurement, each sample was cut along a cross-section orthogonal to the axis direction of the charging roll 40, and the distance from the outer peripheral surface of the surface layer 403 (or the conductive matrix 404) to the outer peripheral surface of the rubber substrate 402 was measured. For the measurement of the distance, a non-contact laser microscope was used to capture an image. The laser microscope used was "VK-X200" manufactured by KEYENCE CORPORATION (Osaka, Japan). The magnification was set to 1000 times, and the region of the captured image was 200.0 μm×285.1 μm. For each sample, the thickness was measured at 20 positions in the captured image, and then, the mean value thereof was calculated. FIG. 6 shows the mean value of the thickness of the surface layer 403 of each sample.

Figure 7:
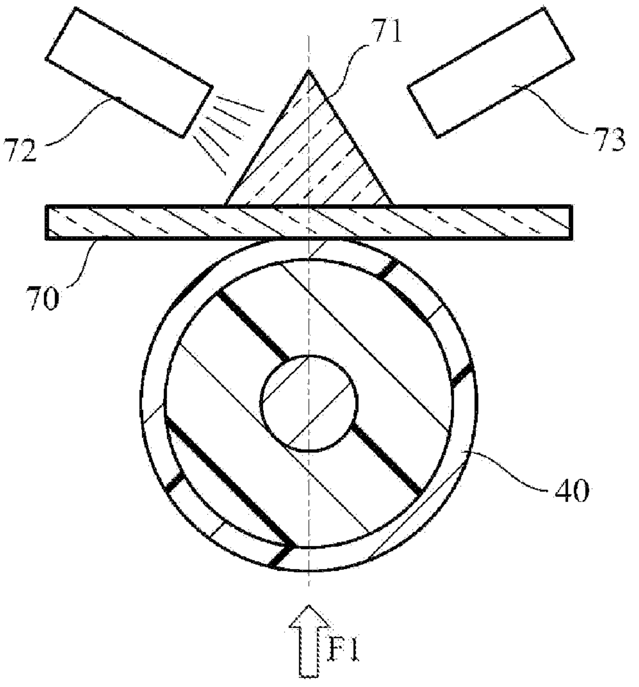
FIG. 7 is a schematic view illustrating a method for measuring a real contact area of each sample of the charging roll with respect to a plane.

Further, the Applicant measured the real contact area of each sample of the charging roll 40 with respect to a plane using a method illustrated in FIG. 7. As illustrated in FIG. 7, a load F1 of 0.6 N was applied to cause each sample of the charging roll 40 to contact a transparent flat glass plate 70, and a transparent triangular prism 71 was arranged on the side opposite to the charging roll 40 such that a plane of the prism 71 was in surface contact with the flat glass plate 70. Then, the charging roll 40 was irradiated with a light beam from a light source 72 through the prism 71 and the flat glass plate 70, and the charging roll 40 compressed by the flat glass plate 70 was image-captured by being magnified with a microscope 73 through the prism 71 and the flat glass plate 70. The microscope 73 used was "VHX-5000" manufactured by KEYENCE CORPORATION (Osaka, Japan). The magnification was set to 100 times, and the region of the captured image was 3.05×2.28 mm. For each sample, a region to be analyzed with a size of 0.6×2.0 mm was selected from the captured image, and an image of the selected region was binarized to calculate the local area (the real contact area) of the charging roll 40 that was actually in contact with the flat glass plate 70. FIG. 6 illustrates the real contact area rate (i.e., a value obtained by dividing the real contact area by the area of the region to be analyzed) of each sample.

Figure 8:
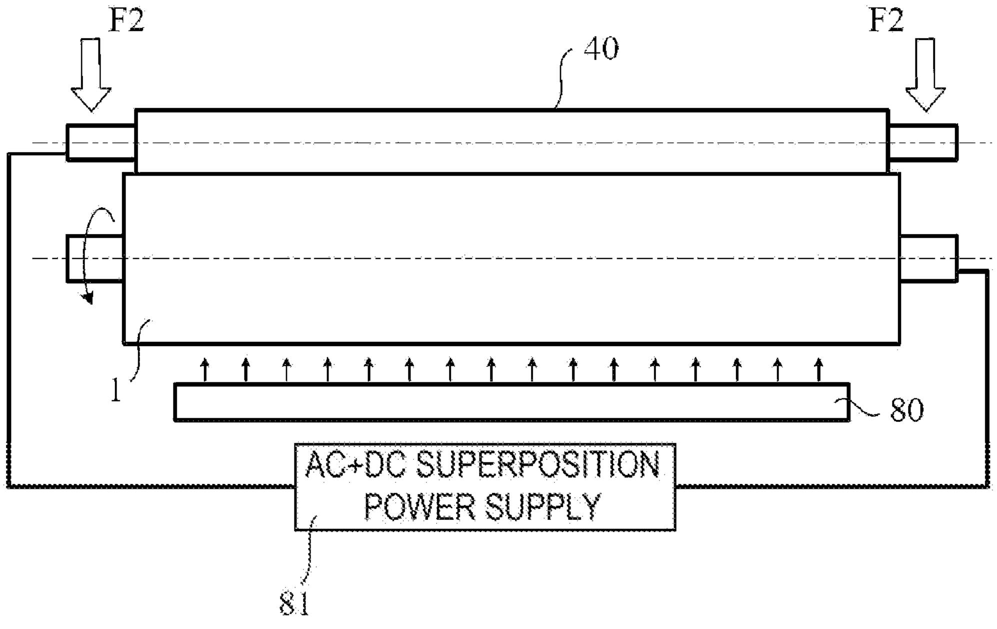
FIG. 8 is a schematic view illustrating a testing machine used in the durability test for each sample of the charging roll.

The Applicant also conducted a durability test on each sample to inspect if the possibility of coming off of the particles 405 can be reduced. FIG. 8 illustrates a testing machine used for the durability test.

The durability testing machine includes the photoconductor drum 1 and an LED (light emitting diode) 80. The photoconductor drum 1 of the durability testing machine was the same as that mounted on a color multifunction printer "TASKalfa 5550ci" manufactured by KYOCERA Document Solutions Japan Inc. (Osaka, Japan). The diameter of the photoconductor drum 1 was 30 mm. The diameter of each sample was about 12 mm. In the durability test, a load F2 of 4.9 N was applied to cause each sample of the charging roll 40 to contact the photoconductor drum 1, and the photoconductor drum 1 was rotation-driven, and further, each sample of the charging roll 40 was rotated to follow it as in the normal usage state. The peripheral speed of the photoconductor drum 1 was 390 mm/sec.

The LED 80 continuously irradiated the photoconductor drum 1 with a light beam during the rotation of the photoconductor drum 1 to remove the surface potential of the photoconductor drum 1.

A power supply 81 for supplying a current to the photoconductor drum 1 and each sample of the charging roll 40 was an AC/DC voltage superposition type. The AC current was set to 3.4 mA, and the AC frequency was set to 3 kHz. The DC current was set to 0.3 mA.

The test duration of the durability test was 30 hours. This corresponds to, when the short-side direction of a sheet of A4 paper coincides with the direction in which the sheet 60 is fed, the time required to print 200,000 sheets.

After 30 hours have elapsed, it was determined if the particles 405 of the roughness-imparting material had come off the conductive matrix 404. For the determination, an image captured at a magnification of 1000 times was observed with the foregoing laser microscope "VK-X200." The region of the captured image was 200.0 μm×285.1 μm. For each sample, the sample surface (the surface layer 403) was image-captured at two positions, and then, each of the captured images was visually observed to determine if the particles 405 of the roughness-imparting material had come off the conductive matrix 404. In FIG. 6, "Bad" indicates that coming off of the particles 405 was found, and "Good" indicates otherwise.

As is obvious from FIG. 6, regarding Samples 1 and 2 each having truly spherical urethane particles as the particles

405 of the roughness-imparting material, the particles 405 came off the conductive matrix 404. However, regarding Samples 3 to 7 each having porous particles as the particles 405 of the roughness-imparting material, the particles 405 did not come off the conductive matrix 404.

Thus, it has been verified that the porous particles are firmly fixed to the conductive matrix 404. According to the results of FIG. 6, it is preferable that the particles 405 of the surface roughness-imparting material be porous, and the specific surface area of the particles 405 be 8.7 $m^2/g$ or greater and 55 $m^2/g$ or less.

In addition, according to the results of FIG. 6, it is preferable that the average diameter of the particles 405 be 5 μm or greater and 6 μm or less. It is considered that the porous particles 405 with a larger diameter can be more firmly fixed to the conductive matrix 404, and the Applicant knows that the truly spherical particles 405 with a diameter of 5 μm or greater and 60 μm or less can exert excellent performance regarding printing. Thus, it is preferable that the average diameter of the particles 405 be 5 μm or greater and 60 μm or less.

Further, according to the results of FIG. 6, it is preferable that the particles 405 be contained in a proportion of 2% or greater and 4% or less of the weight of the surface layer 403.

Furthermore, according to the results of FIG. 6, it is preferable that the mean value of the thickness of the conductive matrix 404 be 0.5 or greater and 3.4 or less of the average diameter of the particles 405 of the surface roughness-imparting material.

Although the present disclosure has been illustrated and described with reference to the preferred embodiment or the present disclosure, a person skilled in the art would understand that any changes to the form and the details are possible without departing from the scope of the claimed disclosure. Such changes, alterations, and modifications should be encompassed within the scope of the present disclosure.

The invention claimed is:

1. A charging roll comprising:

a core;

a rubber substrate arranged around the core; and a surface layer arranged around the rubber substrate, wherein:

the surface layer includes a conductive matrix containing a base material formed of an insulator, and a conductive material dispersed in the base material, and particles of a surface roughness-imparting material dispersed in the conductive matrix, each of the particles of the surface roughness-imparting material is formed of an insulator, is porous, and has a specific surface area of 8.7 $m^2/g$ or greater and 55 $m^2/g$ or less, and wherein the particles of the surface roughness-imparting material are contained in a proportion of 2% or greater and 4% or less of a weight of the surface layer.

2. The charging roll according to claim 1, wherein each of the particles of the surface roughness-imparting material is formed of urethane.

3. The charging roll according to claim 2, wherein a plurality of micropores cross one another in each of the particles of the surface roughness-imparting material.

4. The charging roll according to claim 1, wherein each of the particles of the surface roughness-imparting material is formed of polyamide.

5. The charging roll according to claim 4, wherein a plurality of recesses are formed only in a surface of each of the particles of the surface roughness-imparting material.

6. The charging roll according to claim 1, wherein the particles of the surface roughness-imparting material have an average diameter of 5 μm or greater and 60 μm or less.

7. The charging roll according to claim 1, wherein the conductive matrix of the surface layer has an average thickness of 0.5 or greater and 3.4 or less of an average diameter of the particles of the surface roughness-imparting material.

* * * * *